June 16, 1953     G. A. TINNERMAN     2,641,808
FASTENING DEVICE FOR ELECTRIC WIRES
Original Filed Jan. 11, 1945
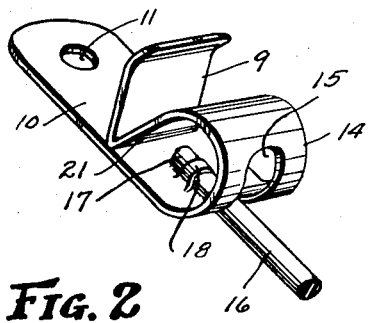
FIG. 2
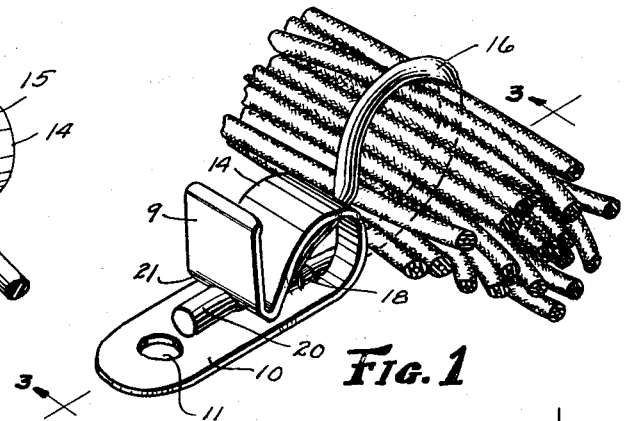
FIG. 1
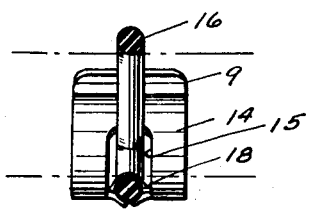
FIG. 4
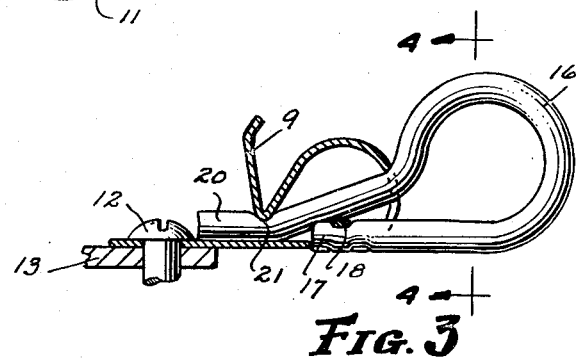
FIG. 3
FIG. 5
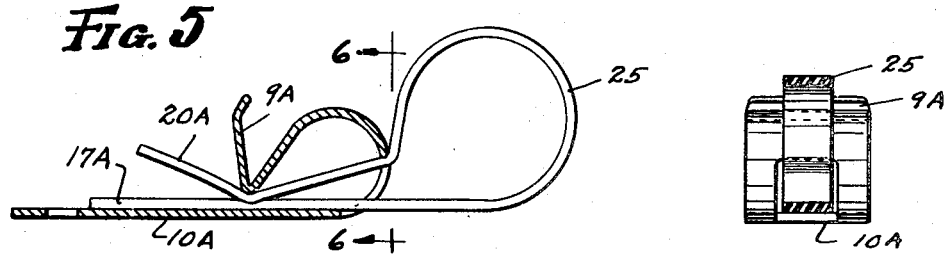
FIG. 6
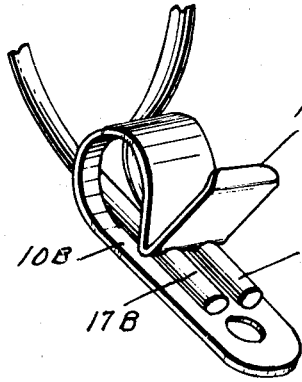
FIG. 7
INVENTOR.
GEORGE A. TINNERMAN
BY
Bates, Teare & McDean
ATTORNEYS Patented June 16, 1953

2,641,808

UNITED STATES PATENT OFFICE 2,641,808

FASTENING DEVICE FOR ELECTRIC WIRES

George A. Tinnerman, Cleveland, Ohio, assignor to Tinnerman Products Inc., Cleveland, Ohio, a corporation of Ohio Original application January 11, 1945, Serial No. 572,311, now Patent No. 2,512,982, dated June 27, 1950. Divided and this application February 24, 1950, Serial No. 146,120

3 Claims. (Cl. 24—18)

This application is a division of my application Ser. No. 572,311, filed January 11, 1945, now Patent No. 2,512,982, issued June 27, 1950, for a Fastening Device for Electric Wires.

This invention relates to a clamp adapted to surround a longitudinally extending body, such for example as an assembly of wires and provide means for the attachment thereof to a support. The invention finds particular applicability in the assembly of wires in an aircraft structure, although it is equally suitable for similar use wherever a bundle of wires is to be supported in assembled relationship.

An object of the invention is to provide a clamp which may be closed upon a group of wires and which operates to hold the wires in compacted form preliminary to the attachment thereof to a support, whereby the wires may be effectively assembled into a longitudinally extending bundle for subsequent attachment of the clamp to the support.

An additional object of the invention is to so make the clamp as to effect a tight fitting engagement around the wires to be supported without damaging the insulation or covering for the wires. Additionally, the invention contemplates a clamp construction wherein the size of the bundle to be clamped is relatively unlimited in that the loop portion of the clamp which embraces the wire is adjustable for any size of bundle.

An additional object is to provide a clamp wherein the loop portion thereof is automatically locked by the spring tension inherent in the loop supporting structure and embodies a part of the clamp assembly.

Referring now to the drawings, Fig. 1 is a perspective view of a clamp embodying the present invention and utilized for holding a bundle of wires in assembled relationship; Fig. 2 is a perspective view of the clamp showing one end of the loop strip fastened to the clamp body; Fig. 3 is a section taken on a plane indicated by the line 3—3 in Fig. 1; Fig. 4 is a section taken on a plane indicated by the line 4—4 in Fig. 3; Fig. 5 is a side view of a modified form of construction; Fig. 6 is a section taken on a plane indicated by the line 6—6 in Fig. 5; Fig. 7 is a perspective view similar to Fig. 1 but showing a slightly modified form of fastener.

As shown in Figs. 1 to 7, the clamp has a body structure and loop structure, with the body structure being formed to hold the loop frictionally in clamping engagement about a bundle of wires. For this purpose the body structure comprises a strip of metal having spring-like characteristics that is reversely bent intermediate its end to provide an arm 10 which has an aperture 11 for receiving a screw or the like 12 for attaching it to a support indicated at 13. The intermediately bent portion of the body structure is indicated at 14 as comprising a relatively wide loop which has a slot 15 extending longitudinally thereof and adapted to receive the ends of a flexible strip 16 which comprises the loop structure that is fitted around the bundle of wires or other object to be supported. In the illustration of Figs. 1 to 4, inclusive, one end 17 of the loop strip is rigidly fastened to the arm 10, preferably by crimping a portion 18 of the arm around the strip, while the other end, after being passed around the bundle of wires is inserted through the slot 15, and then underneath the spring arm 9.

To assure the retention of the loop 20, the arm 9 extends inwardly toward the arm 10 from the intermediate portion 14 and then abruptly outwardly, thereby forming a blunt edged ridge 21 that is adapted to engage the end 20 of the loop and to exert sufficient pressure thereagainst, by virtue of the inherent spring tension in the arm 9, to hold the loop in assembled relationship about a bundle of wires or other articles to be supported.

By making the arm 9 in a substantial V-shape, the free end portion provides a finger grip part by means of which the arm may be lifted to insert the end of the flexible strip therebeneath. It is to be understood that the free end of the strip will be pulled tightly about a bundle of wires, and that when the arm 9 is released, the force exerted by the spring tension thereof will effectively clamp the strip against the arm 10.

The loop strip shown in Figs. 1 to 4 is preferably made of rubber-like material having a slight degree of elasticity and having a cross section which is relatively round in shape. In the modification of Figs. 5 and 6, however, the loop is shown as comprising a flat strip 25, rectangular in shape, and in this modification the end 17A need not be rigidly fastened to the body structure but instead may be passed beneath the end 20A, whereby both ends of the strip are frictionally clamped by the arm 9A against the arm 10A. In this way, the length of a strip to be used for the loop portion may be cut in the desired length to suit the size of the bundle of wires or other object to be supported at the time of making the assembly.

The modification of Fig. 7 may utilize a strip that is round in cross section and is similar to that illustrated in Figs. 1 to 4, inclusive, but in this case the ends 17B and 20B are clamped frictionally in side by side relationship against the arm 10B by means of the spring tension in the arm 10A. In this type of construction, as in the modification of Fig. 5, the looped material may be cut from a coil to the size desired at the time of use.

An advantage of a clamp made in accordance with the present invention is the fact that the body structure embodies a one-piece element that may be stamped and formed from strip stock, and that the loop may be readily furnished in ample size to cover a wide range of sizes of articles to be held thereby. The clamping action upon the loop forming strip is effected by the spring tension of the body structure. One end of the strip may be anchored to the body structure and the other end clamped independently of the anchored end or both ends may be unattached to the fastener body and clamped in tensioned position by the body structure. In either case I have a simple fastening device quickly operable to attach a bundle of wire or other article in any place desired.

I claim:

1. A clamping body comprising a strip of resilient material doubled on itself to present two extreme arms connected by a return bend, one of the extreme arms being bent inward and then abruptly outward in V-formation to provide a clamping edge spring-pressed toward an intermediate region of the other extreme arm, said clamping body having a cut-out portion defining an elongated opening at the return bend, and a flexible loop having both ends passed from the exterior through said opening, one of said ends being attached to the body between the return bend and the clamping region, and the other of said ends being adapted to be clamped in various positions by said clamping edge.

2. A clamping device comprising a strip of resilient material doubled by a return bend providing two arms, one of which has a spring pressure toward an intermediate region of the other, said clamping device having a cut-out portion defining an elongated opening at the return bend, and a flexible looped strip having one end portion passing through the opening and permanently secured to the body of the clamping device by a deformed portion thereof between the return bend and said intermediate region, the other end portion of the loop being adapted to be passed through the opening and into the coacting region between the two arms.

3. A clamping body comprising a strip of resilient material doubled on itself to present a relatively long arm and a relatively short arm connected by a return bend, said short arm extending toward an intermediate region of the long arm and by its resilience tending to press inwardly toward such long arm, said clamping body having a cut-out portion defining an arcuately extending elongated opening through the return bend, and a flexible loop having both end portions, one above the other, projecting through the opening in the return bend, the under end portion of the loop being attached to said long arm between the return bend and inner end of the short arm, and the upper end portion of the loop being engaged by the short arm and clamped by it against said intermediate region of the long arm.

GEORGE A. TINNERMAN.

References Cited in the file of this patent
UNITED STATES PATENTS

| Number | Name | Date |
|---|---|---|
| 881,757 | Winsor | Mar. 10, 1908 |
| 1,564,761 | Daiker | Dec. 8, 1925 |
| 1,635,256 | Carter | July 12, 1927 |
| 2,426,708 | Robertson et al. | Sept. 2, 1947 |
| 2,491,290 | Tinnerman | Dec. 13, 1949 |